(12) United States Patent
Hallivuori et al.

(10) Patent No.: US 9,853,859 B2
(45) Date of Patent: Dec. 26, 2017

(54) NETWORK ELEMENT AND A CONTROLLER FOR MANAGING THE NETWORK ELEMENT

(71) Applicants: Ville Hallivuori, Espoo (FI); Juhamatti Kuusisaari, Helsinki (FI); Sami Finer, Espoo (FI)

(72) Inventors: Ville Hallivuori, Espoo (FI); Juhamatti Kuusisaari, Helsinki (FI); Sami Finer, Espoo (FI)

(73) Assignee: CORIANT OY, Espoo (FI)

( * ) Notice: Subject to any disclaimer, the term of this patent is extended or adjusted under 35 U.S.C. 154(b) by 335 days.

(21) Appl. No.: 14/546,102

(22) Filed: Nov. 18, 2014

(65) Prior Publication Data
US 2015/0142932 A1     May 21, 2015

(30) Foreign Application Priority Data

Nov. 18, 2013    (FI) ...................................... 20136138

(51) Int. Cl.
G06F 15/177     (2006.01)
H04L 12/24     (2006.01)

(52) U.S. Cl.
CPC ...... *H04L 41/0803* (2013.01); *H04L 41/0654* (2013.01); *H04L 41/0866* (2013.01)

(58) Field of Classification Search
None
See application file for complete search history.

(56) References Cited

U.S. PATENT DOCUMENTS

| 7,730,302 B2 * | 6/2010 | Palekar | G06F 21/577 |
| | | | 713/165 |
| 9,350,610 B2 * | 5/2016 | Alford | H04L 67/34 |
| (Continued) | | | |

FOREIGN PATENT DOCUMENTS

| EP | 2424176 | 2/2012 |
| EP | 2806603 A1 | 11/2014 |
| WO | 2013108761 A1 | 7/2013 |

OTHER PUBLICATIONS

Yasunobo Chiba et al: "A Study on Control 1-15 Plane OAM Mechanism for OpenFlow Networks". IEICE Technical Report. Denshi Jouhou Tsuushin Gakkai. JP.vo 1. 110. No. 448. Feb. 24, 2011 (Feb. 24, 2011). pp. 329-334.

(Continued)

*Primary Examiner* — Joshua Joo
(74) *Attorney, Agent, or Firm* — Young & Thompson

(57) ABSTRACT

A network element (101-104) of a software-defined network is adapted to construct a configuration system on the basis of configuration data received from a controller (105, 106) of the software-defined network. The network element is arranged to transmit, in response to an event indicating a need to verify the configuration system, status information to the controller. The event may include for example a loss and a subsequent reestablishment of a connection between the network element and the controller. The status information indicates a first portion of the configuration data which has been implemented in the configuration system prior to the event. After receiving the status information, the controller is able transmit an appropriate second portion of the configuration data to the network element so as to enable verification of an appropriate portion of the configuration system. Thus, there is no need to verify the whole configuration system after the event.

19 Claims, 5 Drawing Sheets

(56) References Cited

U.S. PATENT DOCUMENTS

| | | | |
|---|---|---|---|
| 2005/0078600 A1* | 4/2005 | Rusmisel | G06F 11/2038 370/217 |
| 2006/0126530 A1 | 6/2006 | Fuhrmann et al. | |
| 2009/0012966 A1 | 1/2009 | Arai et al. | |
| 2009/0052445 A1 | 2/2009 | Folkes | |
| 2010/0281143 A1* | 11/2010 | Krahn | H04L 67/42 709/221 |
| 2012/0054537 A1 | 3/2012 | Tornqvist | |
| 2012/0102166 A1 | 4/2012 | Wackerly | |
| 2012/0151020 A1* | 6/2012 | Bolay | G06F 8/65 709/221 |
| 2013/0347055 A1* | 12/2013 | Motoyama | G06F 21/00 726/1 |
| 2016/0050104 A1* | 2/2016 | Wackerly | H04L 41/12 370/220 |
| 2016/0308785 A1* | 10/2016 | Padmanabhan | H04L 47/825 |

OTHER PUBLICATIONS

Zoltan Lajos Kis et al: "OpenFlow Switch 1-15 Specification". Internet Citation. Dec. 5, 2011 pp. 1-83 (Dec. 5, 2011).
Andreas Wundsam et al: "NOSIX: A Portable 1-15 Switch Interface for the Network Operating System" • TR-12-013. Oct. 1, 2012 (Oct. 1, 2012).
Shriram Rajagopalan et al: "Pico replication", Proceedings of the 4th Annual Symposium on Cloud Computing, SOCC '13, Oct. 1, 2013 (Oct. 1, 2013),—Oct. 3, 2013 (Oct. 3, 2013), pp. 1-15.
European Search Report, for corresponding patent application.
Finnish Search Report dated Jul. 16, 2014, corresponding to the Foreign Priority Application No. 20136138.

\* cited by examiner

NETWORK ELEMENT AND A CONTROLLER FOR MANAGING THE NETWORK ELEMENT

FIELD OF THE INVENTION

The invention relates generally to a software-defined network "SDN". More particularly, the invention relates to a network element for a software-defined network and to a controller of a software-defined network. Furthermore, the invention relates to a method for enabling a controller of a software-defined network to manage a network element and to a method for managing a network element of a software-defined network. Furthermore, the invention relates to a computer program for a network element of a software-defined network and to a computer program for a controller of a software-defined network.

BACKGROUND

Software-defined networking is an emerging architecture for data transfer networks. In a software-defined network "SDN", the control plane is separated from the data plane so that the control plane is implemented in one or more controllers that can be separate from the network elements and the data plane is implemented in the network elements. The network elements can be, for example, Internet Protocol "IP" routers, multiprotocol label switching "MPLS" nodes, packet optical switches, and/or Ethernet switches. Each network element may consist of a single apparatus or a combination of a plurality of apparatuses. Typically, the software-defined networking allows for quick experimenting and optimization of switching and/or routing policies and external access to the innards of network elements that formerly were closed and proprietary.

Internet Protocol "IP" based networks were initially built based on the concept of Autonomous Systems "AS". This concept allows networks to scale and extend by connected junctions that forward packets to a reasonable next hop based on partial need-to-know information. The AS principle works much like the traditional post office service, where a postal worker in a given city does not need to know all the tenants of all the streets in another city in order to choose a reasonable next hop for a letter at hand. This approach to networking is simple, and has proven resilient and scalable. This approach has, however, a few drawbacks. It does not allow the designated destinations, or tenants with home mail-boxes, to move without changing their identity as far as the packet delivery service is concerned. The topological location of destinations, which is the network interface they are attached to, dictates their identity related to the packet delivery service. In addition, using only the basic AS principle, it is hard to specify other qualities, such as logical grouping, access control, quality of service, intermediate network processing, or to specify aspects that relate to a sequence of packets that form a flow.

In the following, the software-defined networking is illustrated in a simplified manner using the analogy to the postal service. For any given street location, the software-defined networking works so that all the letters from all the tenants would first be aggregated by a network element on an edge a software-defined network. This network element is configured to examine the current location for each of the letter-destinations using a global lookup mechanism. Based on that global lookup and on other globally defined and globally measured considerations, such as access control or remote location load conditions, the said network element places one or more of the original letters in an additional envelope addressed to each of the street locations where the destinations currently are. It then uses the normal postal service which works like the traditional Internet Protocol "IP" to get these outer envelopes to the remote locations. This is done based on the existing and scalable hop-by-hop forwarding services. The outer letters are then opened by a remote network element and the original envelopes are delivered to the destinations. It is to be noted that the above-presented analogy between the software-defined networking and the postal service is a strong simplification and it gives only a limited viewpoint about the versatile possibilities provided by the software-defined networking.

The software defined networking is, however, not free from challenges. Some of the challenges are related to configuring the network elements. When configuring a network element, the controller sends to the network element configuration data with the aid of which the network element constructs a configuration system. The configuration system enables the network element to operate as a part of a software-defined network "SDN". The configuration system may comprise for example one or more look-up tables defining actions to be carried out in different operational situations.

In a software-defined network, many events which may cause a need to verify the integrity of the configuration system of a network element may take place. The verb "to verify" is to be understood in the broad sense so that it may cover for example checking the integrity of the configuration system, restoring the integrity of configuration system, reconstructing the configuration system, and/or any other process for ensuring the congruency between the configuration system and the status of the controller. Events causing the need to verify the configuration system can be, for example, a case where a connection between the controller and the network element has been lost and subsequently re-established, a case where the operational responsibility is received by the network element from another network element, a case where the management responsibility is received by the controller from another controller, a case where the controller sends to the network element a notice message indicating the need to verify the configuration system, etc. The configuration system of the network element can be, however, quite large and thus it may take time to verify the whole configuration system and moreover the required amount of data that needs to be transferred between the controller and the network element can be significant.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

In accordance with the invention, there is provided a new network element for a software-defined network "SDN". The network element can be, for example, an Internet Protocol "IP" router, a multiprotocol label switching "MPLS" switch, a packet optical switch, and/or an Ethernet switch. A network element according to the invention comprises:

a data transfer interface for receiving, from a controller system communicatively connected to the network element, configuration data enabling the network element to construct a configuration system so as to enable the network element to operate as a part of the software-defined network, and a processing system for constructing the configuration system on the basis of the configuration data.

The processing system is adapted to:

control, in response to an event indicative of a need to verify the configuration system, the data transfer interface to transmit status information to the controller system, the status information indicating a first portion of the configuration data, where the first portion of the configuration data has been implemented in the configuration system prior to the event, and verify, in response to receiving a second portion of the configuration data, a portion of the configuration system corresponding to the second portion of the configuration data, the second portion of the configuration data comprising data external to the first portion of the configuration data.

In most cases, the need to verify the whole configuration system can be avoided thanks to the above-mentioned status information with the aid of which it is possible to define which portion of the configuration system does not need be verified. Hence, in most cases, the time consumption and the amount of data traffic between the controller system and the network element can be reduced.

In accordance with the invention, there is provided also a new controller for managing a network element of a software-defined network "SDN". The controller can be a part of a controller system constituted by many controllers of the software-defined network. It is also possible that the controller alone constitutes the controller system of the software-defined network. Furthermore, the controller can be a single apparatus or a combination of a plurality of apparatuses capable of communicating with each other. A controller according to the invention comprises:

a data transfer interface for transmitting, to the network element, configuration data enabling the network element to construct a configuration system so as to enable the network element to operate as a part of the software-defined network, and a processing system for controlling the data transfer interface to transmit the configuration data to the network element, wherein:

the data transfer interface is adapted to receive, from the network element, status information indicating a first portion of the configuration data, where the first portion of the configuration data has been implemented in the configuration system of the network element prior to an event indicative of a need to verify the configuration system of the network element, the processing system is adapted to identify, in response to receiving the status information, a second portion from the configuration data on the basis of the status information, the second portion of the configuration data comprising data external to the first portion of the configuration data, and the processing system is adapted to control, in response to the receiving the status information, the data transfer interface to transmit the second portion of the configuration data to the network element so as to enable verification of a portion of the configuration system corresponding to the second portion of the configuration data.

Advantageously, the processing system is adapted to define, in response to receiving the above-mentioned status information, the second portion of the configuration data from among the configuration data at least partly on the basis of the status information prior to the second portion of the configuration data is transmitted to the network element.

In accordance with the invention, there is provided also a new method for enabling a controller system of a software-defined network "SDN" to manage a network element of the software-defined network. The network element comprises a data transfer interface for receiving, from the controller system, configuration data enabling the network element to construct a configuration system so as to enable the network element to operate as a part of the software-defined network. The method comprises:

transmitting, in response to an event indicative of a need to verify the configuration system, status information to the controller system, the status information indicating a first portion of the configuration data, where the first portion of the configuration data has been implemented in the configuration system prior to the event, and verifying, in response to receiving a second portion of the configuration data, a portion of the configuration system corresponding to the second portion of the configuration data, the second portion of the configuration data comprising data external to the first portion of the configuration data.

In accordance with the invention, there is provided also a new method for managing the network element. The method comprises:

receiving, from the network element, the status information indicating the first portion of the configuration data, identifying, in response to receiving the status information, a second portion from the configuration data on the basis of the status information, the second portion of the configuration data comprising data external to the first portion of the configuration data, and transmitting, in response to the receiving the status information, the second portion of the configuration data to the network element so as to enable verification of the portion of the configuration system corresponding to the second portion of the configuration data.

In accordance with the invention, there is provided also a new computer program for a network element of a software-defined network wherein the network element comprises a data transfer interface for receiving, from a controller system of the software-defined network, configuration data enabling the network element to construct a configuration system so as to enable the network element to operate as a part of the software-defined network. The computer program for the network element comprises computer executable instructions for controlling a programmable processing system of the network element to:

control, in response to an event indicative of a need to verify the configuration system, the data transfer interface to transmit status information to the controller system, the status information indicating a first portion of the configuration data, where the first portion of the configuration data has been implemented in the configuration system prior to the event, and verify, in response to receiving a second portion of the configuration data, a portion of the configuration system corresponding to the second portion of the configuration data, the second portion of the configuration data comprising data external to the first portion of the configuration data.

In accordance with the invention, there is provided also a new computer program for a controller of a software-defined network, wherein the controller comprises a data transfer interface for transmitting, to a network element of the software-defined network, configuration data enabling the network element to construct a configuration system so as to enable the network element to operate as a part of the software-defined network. The computer program for the controller comprises computer executable instructions for controlling a programmable processing system of the controller to:

detect a reception of status information from the network element, the status information indicating a first portion of the configuration data, where the first portion of the configuration data has been implemented in the configuration system prior to an event indicative of a need to verify the configuration system, identify, in response to the reception of the status information, a second portion from the configuration data on the basis of the status information, the second portion of the configuration data comprising data external to the first portion of the configuration data, and control, in response to receiving the status information, the data transfer interface to transmit the second portion of the configuration data to the network element so as to enable verification of a portion of the configuration system corresponding to the second portion of the configuration data.

In accordance with the invention, there is provided also a new computer program product. The computer program product comprises a non-volatile computer readable medium, e.g. a compact disc "CD", encoded with a computer program according to the invention for a network element of a software-defined network and/or with a computer program according to the invention for a controller of the software-defined network.

A number of exemplifying and non-limiting embodiments of the invention are described in accompanied dependent claims.

Various exemplifying and non-limiting embodiments of the invention both as to constructions and to methods of operation, together with additional objects and advantages thereof, will be best understood from the following description of specific exemplifying embodiments when read in connection with the accompanying drawings.

The verbs "to comprise" and "to include" are used in this document as open limitations that neither exclude nor require the existence of also un-recited features. The features recited in the accompanied depending claims are mutually freely combinable unless otherwise explicitly stated. Furthermore, it is to be understood that the use of "a" or "an", i.e. a singular form, throughout this document does not exclude a plurality.

BRIEF DESCRIPTION OF THE FIGURES

The exemplifying and non-limiting embodiments of the invention and their advantages are explained in greater detail below with reference to the accompanying drawings, in which.

DESCRIPTION OF EXEMPLIFYING EMBODIMENTS

Figure 1:
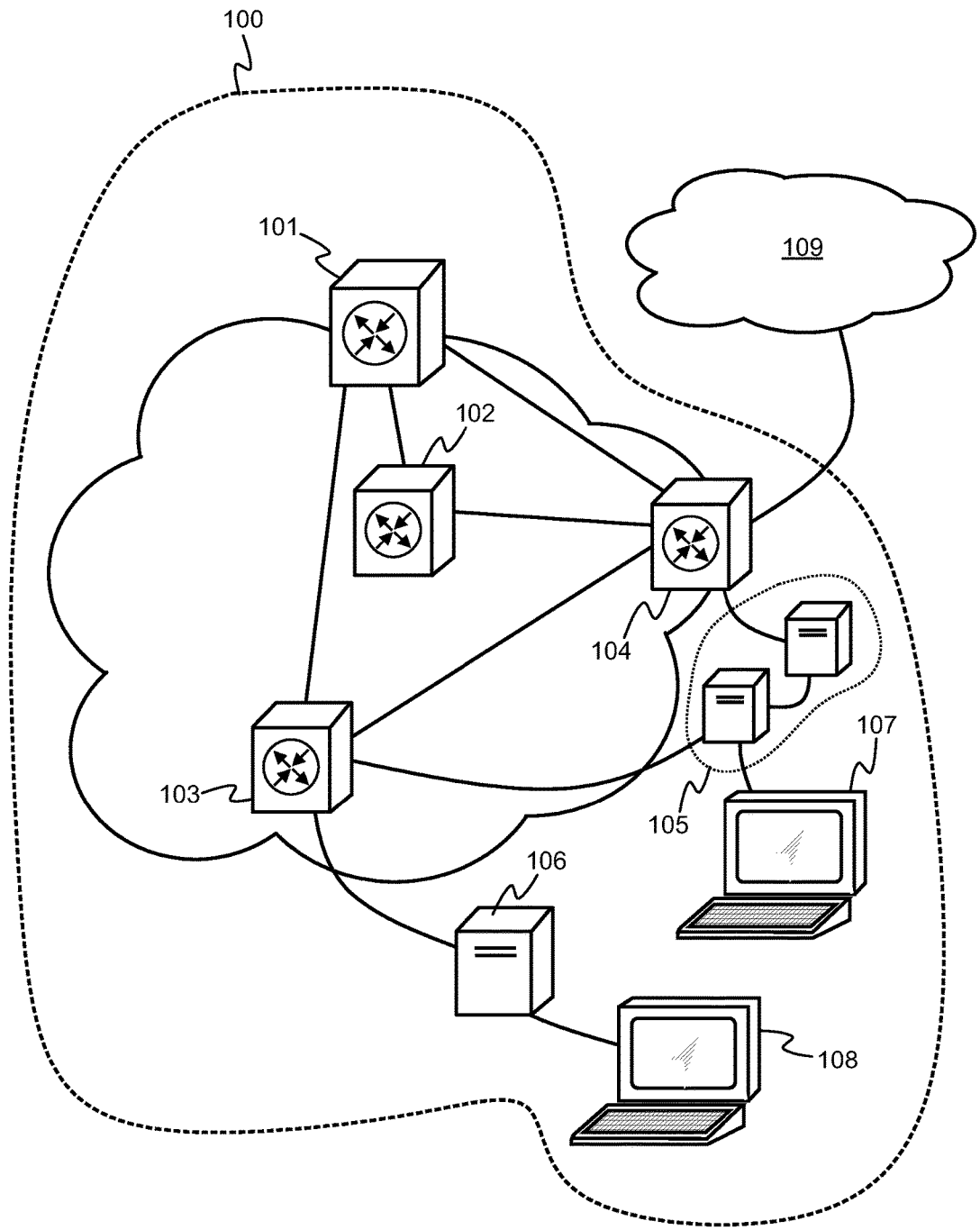
FIG. 1 shows a schematic illustration of a software-defined network comprising network elements according to an exemplifying embodiment of the invention and controllers according to an exemplifying embodiment of the invention.

FIG. 1 shows a schematic illustration of an exemplifying software-defined network "SDN" 100. The software-defined network comprises network elements 101, 102, 103, and 104. The software-defined network 100 further comprises controllers 105 and 106 that can be deemed to constitute a controller system of the software-defined network. The network elements 101-104 of this exemplifying software-defined network are mutually interconnected with data transfer links as illustrated in FIG. 1. Furthermore, the exemplifying software-defined network "SDN" 100 may comprise other network elements that are not shown in FIG. 1. Each of the network elements may be e.g. an Internet Protocol "IP" router, a multiprotocol label switching "MPLS" node, a packet optical switch, and/or an Ethernet switch. Each network element may consist of a single apparatus or a combination of a plurality of apparatuses. As well, each of the controllers 105 and 106 may consist of a single apparatus or a combination of a plurality of apparatuses. In the exemplifying case illustrated in FIG. 1, the controller 105 comprises two interconnected apparatuses. A user-interface device 107 is connected to the controller 105, and correspondingly a user-interface device 108 is connected to the controller 106. In the exemplifying case illustrated in FIG. 1, the network element 102 acts as a gateway to an external network 109 that can be e.g. the global Internet. It is to be noted that the controller 105 or one or more parts of it can also act as one or more network elements that can be e.g. an Internet Protocol "IP" router, a multiprotocol label switching "MPLS" switch, a packet optical switch, and/or an Ethernet switch. Correspondingly, the controller 106 or one or more parts of it can also act as one or more network elements of the kind mentioned above.

Without limiting generality and for illustrative purposes, we consider the operation of the controller 105. The controller 106 may operate in the similar way, and/or the controller 106 may constitute a backup for the controller 105. The controller 105 is adapted to send, to at least one of the network elements 101-104, configuration data enabling the network element under consideration to construct a configuration system that enables the network element to manage data in a desired manner. The configuration system comprises typically a system of interconnected look-up tables defining actions to be carried out in different operational situations. The data can be in form of data frames such as for example Internet Protocol IP-packets, MPLS-labeled frames, Ethernet frames, or the data can be in some other form accordant with one or more data transfer protocols being used. The controller 105 can be adapted to configure the network element under consideration in accordance with the OpenFlow or some other suitable protocol. The OpenFlow is managed by the Open Networking Foundation "ONF". In the exemplifying case where the OpenFlow is used, the configuration system comprises a look-up system that may include one or more successive flow tables and a group table. Each flow table contains a set of flow entries. Each flow entry may consist of match fields, counters, and a set of actions to apply to matching data frames. The group table contains group entries, where each group entry may contain a list of actions to be directed to data frames defined to belong to a particular group. Furthermore, the configuration data that is sent to one or more of the network elements 101-104 may define one or more configuration programs each of which comprising one or more computer executable instructions defining an action or a chain of actions to be executed in conjunction with managing data in the network element under consideration. The action or the chain of actions defined by the configuration program may comprise for example: recording data into a memory, modifying the data, selecting one or more of egress ports of the network element and forwarding the data and its possible duplicates to the selected one or more egress ports, selecting one or more look-up tables of the configuration system of the network element and executing one or more look-ups from the selected look-up tables, performing arithmetic operations, branching operations, performing logical operations, reading metadata associated with the data being managed, writing metadata associated with the data, modifying metadata associated with the data, dropping the data, and/or duplicating the data.

In the software-defined network 100, many different events which may cause a need to verify the configuration system of one or more of the network elements 101-104 may take place. The verb "to verify" is to be understood in the broad sense so that it may cover for example checking the integrity of the configuration system, restoring the integrity of configuration system, reconstructing the configuration system, constructing a part of the configuration system, and/or any other process for ensuring the congruency between the configuration system and the status of the controller under consideration. Events causing the need to verify the configuration system can be, for example, a case where a data transfer connection between the controller and the network element has been lost and subsequently re-established, a case where the operational responsibility is received by the network element from another network element, a case where the management responsibility is received by the controller from another controller, a case where the controller sends to the network element a notice message indicating the need to verify the configuration system, etc.

Without limiting generality and for illustrative purposes, the operation of the network element 101 together with the operation of the controller 105 is considered in the following. The network element 101 comprises means for receiving the above-mentioned configuration data which enables the network element 101 to construct the configuration system enabling the network element to operate as a part of the software-defined network 100. The network element 101 is adapted to transmit status information to the controller 105 in response to an event of the kind mentioned above and indicative of a need to verify the configuration system of the network element. The status information indicates such a first portion of the configuration data which has been implemented in the configuration system prior to the above-mentioned event. Therefore, the status information informs the controller 105 about those items of the configuration data which can be deemed to be properly implemented in the configuration system of the network element 101 regardless of the event such as e.g. a loss and a subsequent re-establishment of a data transfer connection between the network element 101 and the controller 105, or transfer of the operative responsibility from the controller 106 to the controller 105, etc. Therefore, only a portion of the configuration system which corresponds to a second portion of the configuration data other than the above-mentioned first portion has to be verified. In order to enable the verification of the above-mentioned portion of the configuration system, the controller 105 transmits the above-mentioned second portion of the configuration data to the network element 105. Thereafter, the network element verifies the above-mentioned portion of the configuration system. The verification may comprise for example constructing or re-constructing the above-mentioned portion of the configuration system on the basis of the second portion of the configuration data, or comparing the portion of the configuration system to the second portion of the configuration data and correcting possible deviations of the portion of the configuration system on the basis of the second portion of the configuration data, or any other process for ensuring the congruency between the configuration system and the status of the controller 105.

It is worth noting that the above-mentioned status information does not necessarily have to inform the controller 105 about all of the configuration data which has been properly implemented in the configuration system prior to the above-mentioned event. In other words, the above-mentioned first portion of the configuration data does not necessarily have to contain all the configuration data which have been properly implemented prior to the event. Thus, the above-mentioned second portion of the configuration data may contain also such configuration data which have been properly implemented in the configuration system of the network element 101 prior to the event under consideration. The effect of this is, however, merely economical from the viewpoint of workload in the sense that such a part of the configuration system whose verification is unnecessary is nevertheless verified. On the other hand, a quite complex signaling arrangement between the controller 105 and the network element 101 would be needed in many cases if the above-mentioned status information were required to inform the controller 105 about all configuration data which has been properly implemented prior to the event under consideration. Hence, it is advantageous to have a reasonable balance between the unnecessary verifications of the kind described above and the complexity of the signaling arrangement between the controller 105 and the network element 101.

In a software-defined network according to an exemplifying embodiment of the invention, the controller 105 is adapted to transmit, after receiving the above-mentioned status information, queries to the network element. Each of these queries addresses to a particular part of the configuration system of the network element, e.g. to one or more entries of a look-up table system, and requests the network element 101 to send, to the controller 105, information about the addressed part of the configuration system. On the basis of the information received in response to the queries, the controller 105 can further delimit the above-mentioned second portion of the configuration data which is to be transmitted to the network element 101, i.e. the controller can find out whether there is a need to correct one or more particular parts of the configuration system which might be in proper order but cannot be deemed to be in proper order merely on the basis of the above-mentioned status information. The verification by possibly needed corrections can be interleaved with the transmission of the queries and the receptions of the corresponding response information so that the part of the configuration system related to each query is verified by possibly needed corrections prior to transmitting a next query. In this case, the second portion of the configuration data is transferred to the network element during many mutually separate time intervals. It is, naturally, also possible that all the queries are transmitted and all the responses are received first, and the verification by possibly needed corrections is carried out subsequently. It is also possible that a set of queries are transmitted and their responses are received first and the parts of the configuration system related to the set of queries is verified by possibly needed corrections prior to transmitting a next set queries.

In a software-defined network according to an exemplifying embodiment of the invention, the controller 105 is adapted to transmit, to the network element 101, check data items among the configuration data so that items of the configuration data and the check data items constitute a sequence of data items transferred from the controller 105 to the network element 101. In the exemplifying case where the OpenFlow is used, the check data items can be carried by OpenFlow barrier commands each ensuring that items of the configuration data arrived before the barrier under consideration are implemented in the network element prior to items of the configuration data arrived after the barrier. The network element 101 which receives the configuration data and the check data items can be adapted transmit, to the controller 105, acknowledgements so that each acknowledgement relates to one of the check data items and informs the controller that those items of the configuration data which precede, in the reception order or in some other applicable order, the check data item under consideration have been implemented in the configuration system. The check data items and the acknowledgements are advantageously unique within the scope of the operation of the controller so that the controller can monitor the progress of the configuration processes carried out in the network elements managed by the controller. The above-mentioned check data items can be used as a basis for the status information which informs the controller 105 about the first portion of the configuration data, where the first portion can be deemed to be properly implemented in the configuration system of the network element 101 prior to an event such as e.g. a loss and a subsequent re-establishment of a data transfer connection. The network element 101 can be adapted to set the status information to express such one of the check data items which, in the reception order or in the other applicable order, is preceded only by such items of the configuration data which have been properly implemented in the configuration system prior to the event. In order to minimize the workload caused by unnecessary verifications, the check data item expressed by the status information is advantageously the most recently received such check data item which, in the reception order or in the other applicable order, is preceded only by such items of the configuration data which have been properly implemented in the configuration system prior to the event. As can be understood, the average amount of unnecessary verifications, i.e. the average amount of items of the configuration data implemented in the configuration system prior to the event but not indicated by the status information, depends on the number of consecutively transmitted items of the configuration data between two successive check data items. In cases where: a) the above-mentioned acknowledgements are used, and b) the status information expresses the most recently received check data item which, in the reception order or in the other applicable order, is preceded only by such configuration data items which have been properly implemented prior to the event, the controller can be adapted to release memory areas storing transmission order or another applicable order of configuration data items and check data items transmitted between these configuration data items in response to receiving an acknowledgement that expresses that these configuration data items have been implemented in the configuration system of the network element. The memory capacity can be saved in the above-described way because, after an event indicating a need to verify the configuration system, all the configuration data items which have been successfully acknowledged to be implemented in the configuration system are, according to the status information, such configuration data items which have been implemented in the configuration system prior to the event. Thus, a data stream constituted by these configuration data items and by the check data items between them does not need to be transmitted/re-transmitted to the network element when verifying the configuration system, and therefore the memory areas storing the said data stream can be released for other use.

Figure 2:
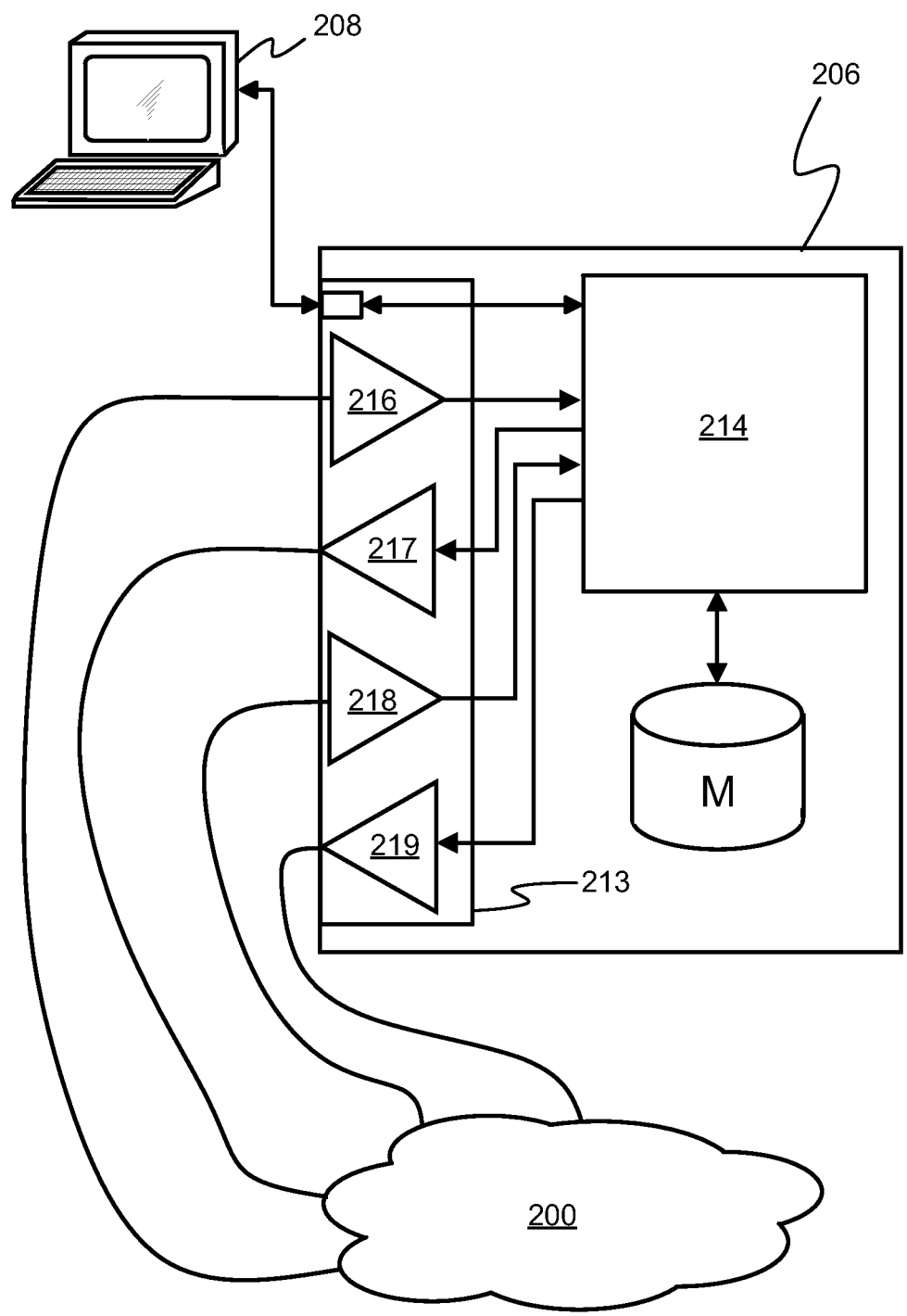
FIG. 2 shows a schematic illustration of a controller according to an exemplifying embodiment of the invention for managing a network element of a software-defined network.

FIG. 2 shows a schematic illustration of a controller 206 according to an exemplifying embodiment of the invention for managing a network element of a software-defined network. The network element is not shown in FIG. 2. In the exemplifying case illustrated in FIG. 2, the controller is a single apparatus but, as mentioned earlier in this document, the controller could as well be a combination of a plurality of apparatuses. The controller comprises a data transfer interface 213 for receiving data and for transmitting data. The data transfer interface 213 comprises ingress ports 216 and 218 and egress ports 217 and 219 for connecting via data transfer links to a data transfer network 200. The data transfer interface 213 may further comprise one or more data ports for connecting to a user interface device 208 and/or to other peripheral devices. The data transfer interface 213 is suitable for transmitting, to the network element being managed, configuration data enabling the network element to construct a configuration system so as to enable the network element to operate as a part of the software-defined network. The controller comprises a processing system 214 for controlling the data transfer interface 213 to transmit the configuration data to the network element. The data transfer interface 213 is adapted to receive, from the network element, status information which indicates a first portion of the configuration data, where the first portion of the configuration data has been implemented in the configuration system of the network element prior to an event indicative of a need to verify the configuration system of the network element. The processing system 214 is adapted to define, in response to receiving the above-mentioned status information, a second portion of the configuration data at least partly on the basis of the status information and to control the data transfer interface 213 to transmit the second portion of the configuration data to the network element so as to enable verification of a portion of the configuration system corresponding to the second portion of the configuration data.

In a controller according to an exemplifying embodiment of the invention:

the data transfer interface 213 is adapted to transmit, to the network element, check data items among the configuration data, the data transfer interface is adapted to receive, from the network element, acknowledgements each relating to one of the check data items and informing the controller that those items of the configuration data which precede, in a transmission order or in some other applicable order, the one of the check data items have been implemented in the configuration system of the network element, and the above-mentioned status information expresses such one of the check data items which, in the transmission order or in the other applicable order, is preceded by the above-mentioned first portion of the configuration data and followed by the above-mentioned second portion of the configuration data.

In a controller according to an exemplifying embodiment of the invention, the processing system 214 adapted to, in order to save memory capacity, release memory areas storing a transmission order or some other applicable order of items of a third portion of the configuration data in response to receiving an acknowledgement expressing that the third portion of the configuration data has been implemented in the configuration system of the network element.

The processing system 214 can be implemented with one or more processor circuits, each of which can be a programmable processor circuit provided with appropriate software, a dedicated hardware processor such as, for example, an application specific integrated circuit "ASIC", or a configurable hardware processor such as, for example, a field programmable gate array "FPGA".

Figure 3:
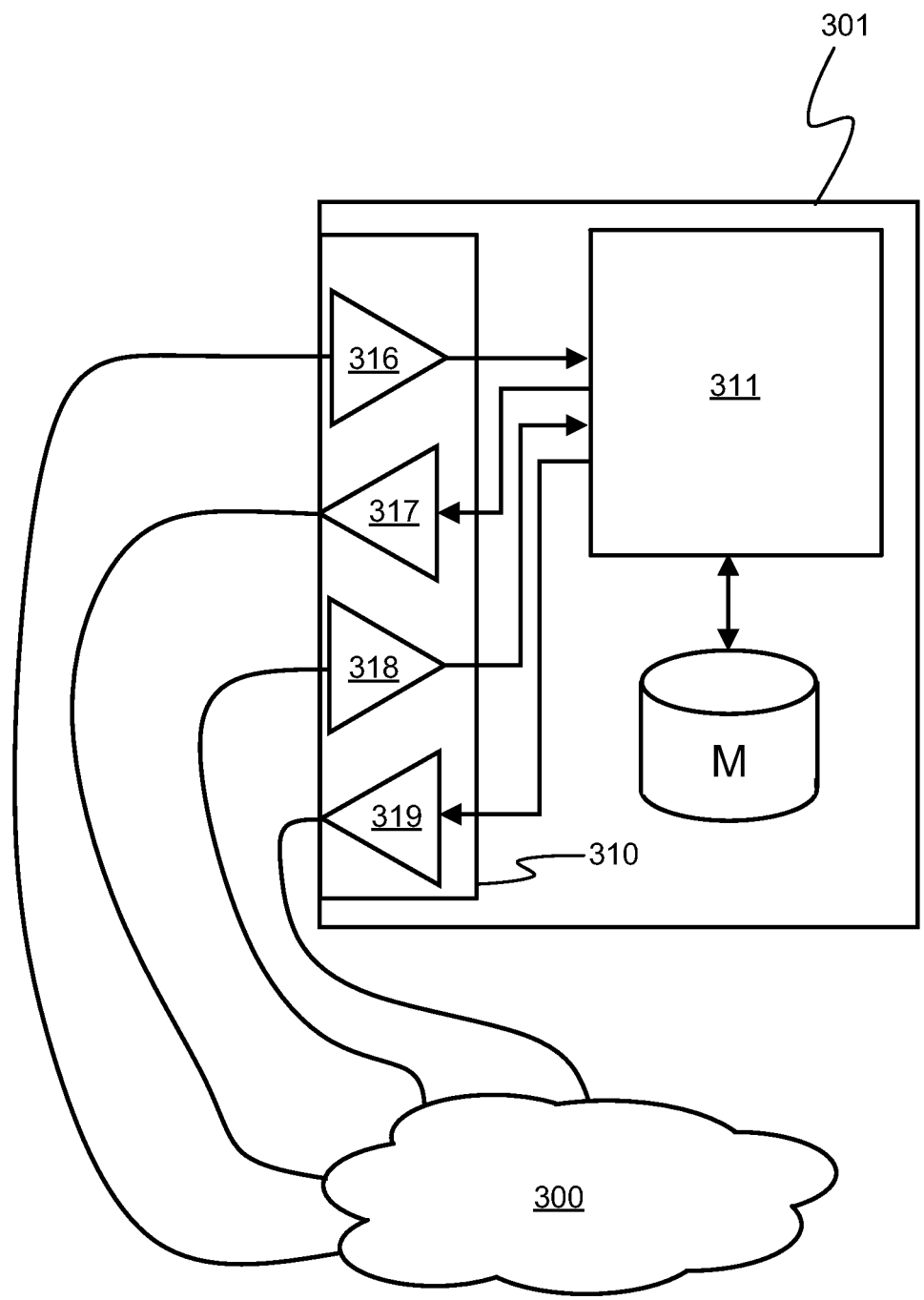
FIG. 3 shows a schematic illustration of a network element according to an exemplifying embodiment of the invention.

FIG. 3 shows a schematic illustration of a network element 301 according to an exemplifying embodiment of the invention for a software-defined network. The network element can be, for example, an Internet Protocol "IP" router, a Multiprotocol label switching "MPLS" switch, a packet optical switch, and/or an Ethernet switch. The network element comprises a data transfer interface 310 for receiving data and for transmitting data. The data transfer interface 310 comprises ingress ports 316 and 318 and egress ports 317 and 319 for connecting via data transfer links to a data transfer network 300. The data transfer interface 310 is suitable for receiving, from a controller system of the software-defined network, configuration data enabling the network element to construct a configuration system so as to enable the network element to operate as a part of the software-defined network. The controller system is not shown in FIG. 3. The network element comprises a processing system 311 for constructing the configuration system on the basis of the configuration data. The configuration system may comprise for example one of more one look-up tables defining actions to be executed in conjunction with managing data to be forwarded by the network element. The processing system 311 is adapted to control, in response to an event indicative of a need to verify the configuration system, the data transfer interface 310 to transmit status information to the controller system. The status information indicates a first portion of the configuration data, where the first portion of the configuration data has been implemented in the configuration system of the network element prior to the above-mentioned event. The processing system 311 is adapted to verify, in response to receiving a second portion of the configuration data from the controller system, a portion of the configuration system corresponding to the second portion of the configuration data.

In a network element according to an exemplifying embodiment of the invention, the processing system 311 is adapted to construct the above-mentioned portion of the configuration system on the basis of the second portion of the configuration data in order to verify the above-mentioned portion of the configuration system.

In a network element according to an exemplifying embodiment of the invention, the processing system is adapted to compare the above-mentioned portion of the configuration system to the second portion of the configuration data and correct possible deviations of the portion of the configuration system on the basis of the second portion of the configuration data in order to verify the above-mentioned portion of the configuration system.

In a network element according to an exemplifying embodiment of the invention, the processing system 311 is adapted to control the data transfer interface 310 to transmit the status information to the controller system in response to a situation in which a disturbance has occurred in at least one of the following data transfer connections: a data transfer connection from the network element to the controller system, a data transfer connection from the controller system to the network element.

In a network element according to an exemplifying embodiment of the invention, the processing system 311 is adapted to control the data transfer interface 310 to transmit the status information to the controller system in response to a situation in which at least one of the following data transfer connections is lost and subsequently re-established: the data transfer connection from the network element to the controller system, the data transfer connection from the controller system to the network element.

In a network element according to an exemplifying embodiment of the invention, the processing system 311 is adapted to control the data transfer interface 310 to transmit the status information to the controller system in response to a situation in which the network element has been a backup for another network element, the configuration system of the network element has been kept at least partially congruent with a configuration system of the other network element, and the network element is activated to operate in lieu of the other network element.

In a network element according to an exemplifying embodiment of the invention, the processing system 311 is adapted to control the data transfer interface 310 to transmit the status information to the controller system in response to a situation in which a first functional entity of the network element has been a backup for a second functional entity of the network element, the configuration system of the first functional entity of the network element has been kept at least partially congruent with a configuration system of the second functional entity of the network element, and the first functional entity of the network element is activated to operate in lieu of the second functional entity of the network element. The first and second functional entities can be for example line or control cards of the network element.

In a network element according to an exemplifying embodiment of the invention, the processing system 311 is adapted to control the data transfer interface 310 to transmit the status information to a first controller of the controller system in response to a situation in which at least the above-mentioned first portion of the configuration data has been received from a second controller of the controller system and the first controller of the controller system is activated to operate in lieu of the second controller of the controller system.

In a network element according to an exemplifying embodiment of the invention, the processing system 311 is adapted to control the data transfer interface 310 to transmit the status information to the controller system in response to receiving a notice message from the controller system, where the reception of the notice message represents the event indicative of the need to verify the configuration system. Thus, the verification of the configuration system can be initiated also by the controller system.

In a network element according to an exemplifying embodiment of the invention:
- the data transfer interface 310 is adapted to receive, from the controller system, check data items among the configuration data,
- the processing system 311 is adapted to control the data transfer interface to transmit, to the controller system, acknowledgements each relating to one of the check data items and informing the controller system that those items of the configuration data which precede, in a reception order or in some other applicable order, the one of the check data items have been implemented in the configuration system, and
- the processing system is adapted to set the above-mentioned status information to express such one of the check data items which, in the reception order or in the other applicable order, is preceded by the above-mentioned first portion of the configuration data and followed by the above-mentioned second portion of the configuration data.

The processing system 311 can be implemented with one or more processor circuits, each of which can be a programmable processor circuit provided with appropriate software, a dedicated hardware processor such as, for example, an application specific integrated circuit "ASIC", or a configurable hardware processor such as, for example, a field programmable gate array "FPGA".

Figure 4:
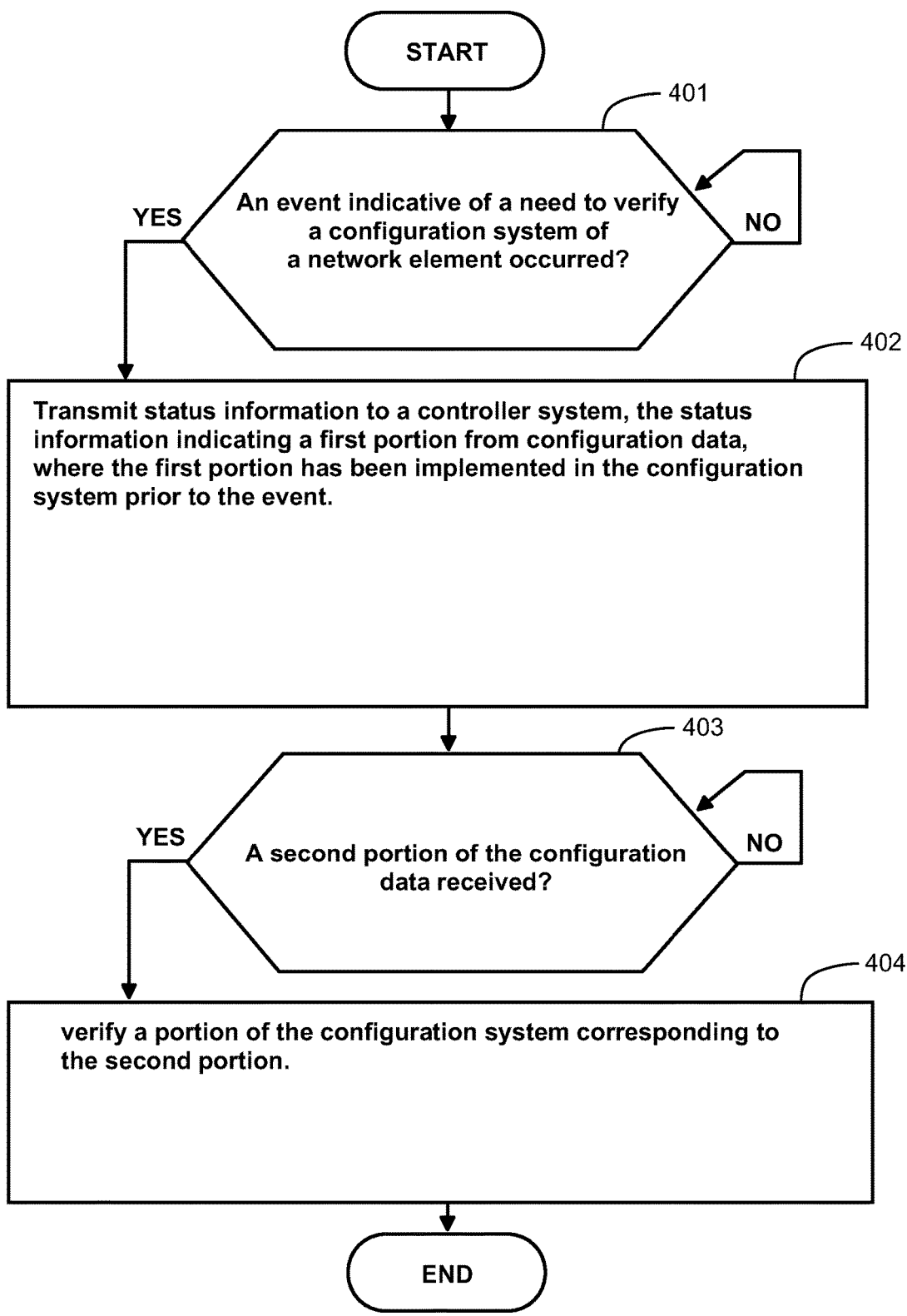
FIG. 4 shows a flow chart of a method according to an exemplifying embodiment of the invention for enabling a controller system of a software-defined network to manage a network element of the software-defined network.

FIG. 4 shows a flow chart of a method according to an exemplifying embodiment of the invention for enabling a controller system of a software-defined network to manage a network element of the software-defined network. The network element comprises a data transfer interface for receiving, from the controller system, configuration data enabling the network element to construct a configuration system so as to enable the network element to operate as a part of the software-defined network. The method comprises the following actions:
- action 402: transmitting, in response to an event 401 indicative of a need to verify the configuration system, status information to the controller system, the status information indicating a first portion of the configuration data, where the first portion of the configuration data has been implemented in the configuration system prior to the event, and
- action 404: verifying, in response to receiving 403 a second portion of the configuration data, a portion of the configuration system corresponding to the second portion of the configuration data.

In a method according to an exemplifying embodiment of the invention, the above-mentioned portion of the configuration system is constructed/re-constructed on the basis of the above-mentioned second portion of the configuration data in order to verify the portion of the configuration system.

In a method according to an exemplifying embodiment of the invention, the above-mentioned portion of the configuration system is compared to the above-mentioned second portion of the configuration data and possible deviations of the portion of the configuration system are corrected on the basis of the second portion of the configuration data.

In a method according to an exemplifying embodiment of the invention, the above-mentioned status information is transmitted to the controller system in response to a situation in which a disturbance has occurred in at least one of the following data transfer connections: a data transfer connection from the network element to the controller system, a data transfer connection from the controller system to the network element.

In a method according to an exemplifying embodiment of the invention, the above-mentioned status information is transmitted to the controller system in response to a situation in which at least one of the following data transfer connections is lost and subsequently re-established: the data transfer connection from the network element to the controller system, the data transfer connection from the controller system to the network element.

In a method according to an exemplifying embodiment of the invention, the above-mentioned status information is transmitted to the controller system in response to a situation in which the network element has been a backup for another network element, the configuration system of the network element has been kept congruent with a configuration system of the other network element, and the network element is activated to operate in lieu of the other network element.

In a method according to an exemplifying embodiment of the invention, the above-mentioned status information is transmitted to a first controller of the controller system in response to a situation in which at least the first portion of the configuration data has been received from a second controller of the controller system and the first controller of the controller system is activated to operate in lieu of the second controller of the controller system.

In a method according to an exemplifying embodiment of the invention, the status information is transmitted to the controller system in response to receiving a notice message from the controller system, the reception of the notice message representing the event indicative of the need to verify the configuration system. In this case, the verification of the configuration system is initiated by the controller system.

A method according to an exemplifying embodiment of the invention comprises:
- receiving, from the controller system, check data items among the configuration data,
- transmitting, to the controller system, acknowledgements each relating to one of the check data items and informing the controller system that those items of the configuration data which precede, in a reception order or in some other applicable order, the one of the check data items have been implemented in the configuration system, and
- setting the status information to express such one of the check data items which, in the reception order or in the other applicable order, is preceded by the above-mentioned first portion of the configuration data and followed by the above-mentioned second portion of the configuration data.

In a method according to an exemplifying embodiment of the invention, the configuration system comprises one of more one look-up tables defining actions to be executed in conjunction with managing data to be forwarded by the network element.

In a method according to an exemplifying embodiment of the invention, the network element is at least one of the following: an Internet Protocol IP router, a MultiProtocol Label Switching MPLS switch, a packet optical switch, an Ethernet switch.

Figure 5:
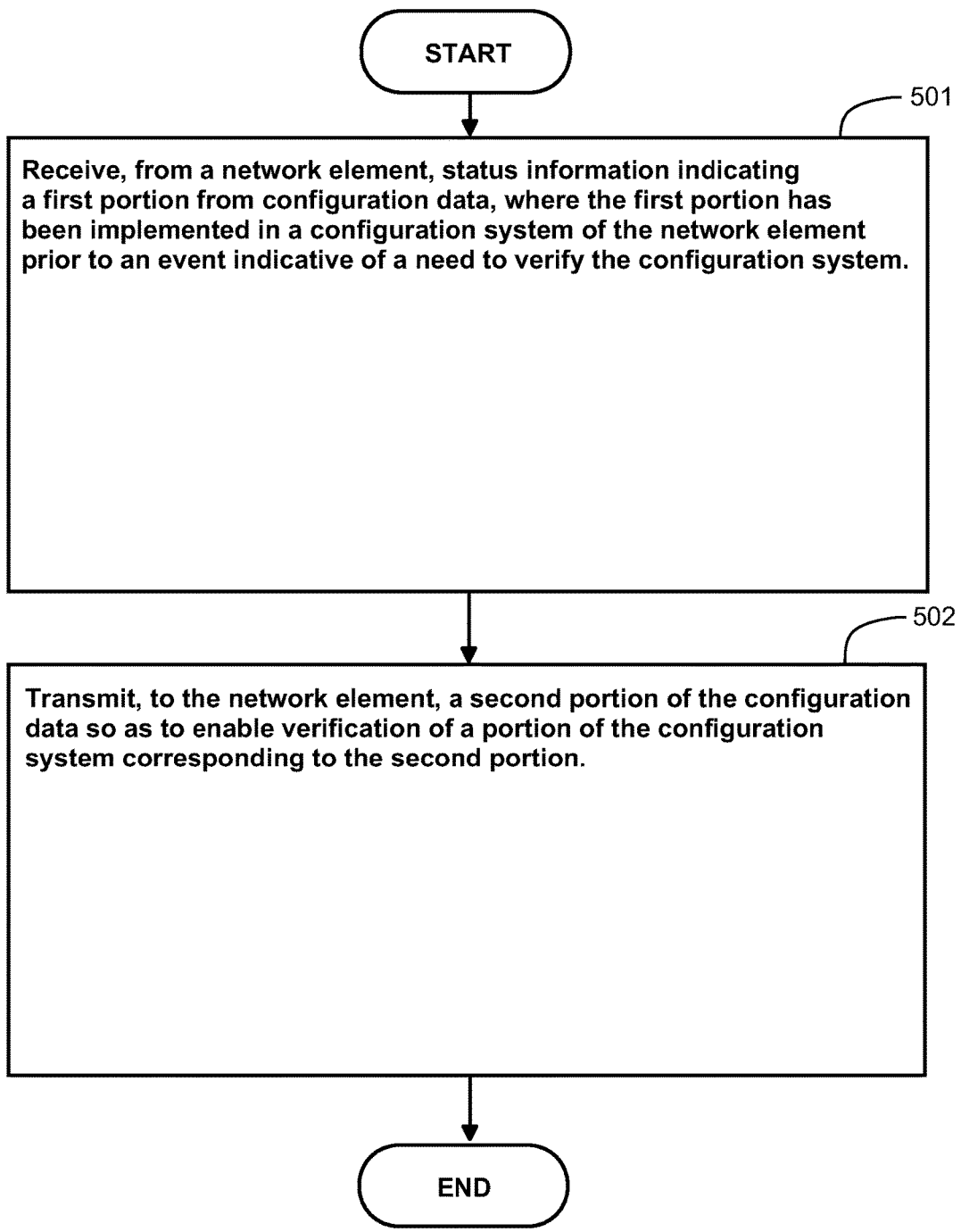
FIG. 5 shows a flow chart of a method according to an exemplifying embodiment of the invention for managing a network element of a software-defined network.

FIG. 5 shows a flow chart of a method according to an exemplifying embodiment of the invention for managing a network element of a software-defined network. The network element comprises a data transfer interface for receiving configuration data enabling the network element to construct a configuration system so as to enable the network element to operate as a part of the software-defined network. The method comprises the following actions:
- action 501: receiving, from the network element, status information indicating a first portion of the configuration data, where the first portion of the configuration data has been implemented in the configuration system prior to an event indicative of a need to verify the configuration system, and
- action 501: transmitting, in response to receiving the status information, a second portion of the configuration data to the network element so as to enable verification of a portion of the configuration system corresponding to the second portion of the configuration data.

A method according to an exemplifying embodiment of the invention comprises:
- transmitting, to the network element, check data items among the configuration data,
- receiving, from the network element, acknowledgements each relating to one of the check data items and expressing that those items of the configuration data which precede, in a transmission order or in some other applicable order, the one of the check data items have been implemented in the configuration system,
wherein the above-mentioned status information expresses such one of the check data items which, in the transmission order or in the other applicable order, is preceded by the above-mentioned first portion of the configuration data and followed by the above-mentioned second portion of the configuration data.

A method according to an exemplifying embodiment of the invention comprises releasing memory areas storing a transmission order or some other applicable order of items of a third portion of the configuration data in response to receiving an acknowledgement expressing that the third portion of the configuration data has been implemented in the configuration system of the network element. In this case, memory capacity of or used by a configuration system of the software defined network can be saved because, concerning those of the configuration data items which have been implemented in the configuration system of the network element, the controller system does not need to remember the sequence according to which these configuration data items have been transmitted to the network element.

A computer program according to an exemplifying embodiment of the invention comprises computer executable instructions for controlling a programmable processing system to carry out a method according to any of the above-described exemplifying embodiments of the invention.

A computer program according to an exemplifying embodiment of the invention comprises software modules for operating a network element of a software-defined network, wherein the network element comprises a data transfer interface for receiving, from a controller system of the software-defined network, configuration data enabling the network element to construct a configuration system so as to enable the network element to operate as a part of the software-defined network. The software modules comprise computer executable instructions for controlling a programmable processing system of the network element to:
- control, in response to an event indicative of a need to verify the configuration system, the data transfer interface to transmit status information to the controller system, the status information indicating a first portion of the configuration data, where the first portion of the configuration data has been implemented in the configuration system prior to the event, and
- verify, in response to receiving a second portion of the configuration data, a portion of the configuration system corresponding to the second portion of the configuration data.

A computer program according to an exemplifying embodiment of the invention comprises software modules for operating a controller of a software-defined network, wherein the controller comprises a data transfer interface for transmitting, to a network element, configuration data enabling the network element to construct a configuration system so as to enable the network element to operate as a part of the software-defined network. The software modules comprise computer executable instructions for controlling a programmable processing system of the controller to:
- detect a reception of status information from the network element, the status information indicating a first portion of the configuration data, where the first portion of the configuration data has been implemented in the configuration system prior to an event indicative of a need to verify the configuration system, and
- control, in response to receiving the status information, the data transfer interface to transmit a second portion of the configuration data to the network element so as to enable verification of a portion of the configuration system corresponding to the second of the configuration data.

A computer program according to an exemplifying embodiment of the invention comprises the above-mentioned software modules for operating the network element of the software-defined network and the above-mentioned software modules for operating the controller of the software-defined network.

The software modules can be e.g. subroutines or functions implemented with a suitable programming language and with a compiler suitable for the programming language and the programmable processing system.

A computer program product according to an exemplifying embodiment of the invention comprises a computer readable medium, e.g. a compact disc "CD", encoded with a computer program according to an exemplifying embodiment of invention.

A signal according to an exemplifying embodiment of the invention is encoded to carry information defining a computer program according to an exemplifying embodiment of invention.

The specific examples provided in the description given above should not be construed as limiting the scope and/or the applicability of the appended claims.

What is claimed is:

1. A network element for a software-defined network, the network element comprising:
- a data transfer interface for receiving, from a controller system communicatively connected to the network element, configuration data enabling the network element to construct a configuration system so as to enable the network element to operate as a part of the software-defined network, and
- a processing system for constructing the configuration system on the basis of the configuration data,
wherein the processing system:
- controls, in response to an event indicative of a need to verify the configuration system, the data transfer interface to transmit status information to the controller system, the status information indicating a first portion of the configuration data, where the first portion of the configuration data has been implemented in the configuration system prior to the event, and verifies, in response to receiving a second portion of the configuration data, a portion of the configuration system corresponding to the second portion of the configuration data, the second portion of the configuration data comprising only data external to the first portion of the configuration data and verifying the portion of the configuration system being one of the following: checking integrity of the portion of the configuration system on the basis of the second portion of the configuration data, restoring the integrity of portion of the configuration system on the basis of the second portion of the configuration data, reconstructing the portion of the configuration system on the basis of the second portion of the configuration data.

2. A network element according to claim 1, wherein the processing system controls the data transfer interface to transmit the status information to the controller system in response to a situation in which a disturbance has occurred in at least one of the following data transfer connections: a data transfer connection from the network element to the controller system, a data transfer connection from the controller system to the network element.

3. A network element according to claim 2, wherein the processing system controls the data transfer interface to transmit the status information to the controller system in response to a situation in which at least one of the following data transfer connections is lost and subsequently re-established: the data transfer connection from the network element to the controller system, the data transfer connection from the controller system to the network element.

4. A network element according to claim 1, wherein the processing system controls the data transfer interface to transmit the status information to the controller system in response to a situation in which the network element has been a backup for another network element, the configuration system of the network element has been kept at least partially congruent with a configuration system of the other network element, and the network element is activated to operate in lieu of the other network element.

5. A network element according to claim 1, wherein the processing system controls the data transfer interface to transmit the status information to the controller system in response to a situation in which a first functional entity of the network element has been a backup for a second functional entity of the network element, the configuration system of the first functional entity of the network element has been kept at least partially congruent with a configuration system of the second functional entity of the network element, and the first functional entity of the network element is activated to operate in lieu of the second functional entity of the network element.

6. A network element according to claim 1, wherein the processing system controls the data transfer interface to transmit the status information to a first controller of the controller system in response to a situation in which at least the first portion of the configuration data has been received from a second controller of the controller system and the first controller of the controller system is activated to operate in lieu of the second controller of the controller system.

7. A network element according to claim 1, wherein the processing system controls the data transfer interface to transmit the status information to the controller system in response to receiving a notice message from the controller system, the reception of the notice message representing the event indicative of the need to verify the configuration system.

8. A network element according to claim 1, wherein the processing system constructs, in order to verify the portion of the configuration system, the portion of the configuration system on the basis of the second portion of the configuration data.

9. A network element according to claim 1, wherein the processing system compares, in order to verify the portion of the configuration system, the portion of the configuration system to the second portion of the configuration data and corrects possible deviations of the portion of the configuration system on the basis of the second portion of the configuration data.

10. A network element according to claim 1, wherein:
the data transfer interface receives, from the controller system, check data items among the configuration data where the configuration data constitutes together with the check data items a data sequence,
the processing system controls the data transfer interface to transmit, to the controller system, acknowledgements each relating to one of the check data items and informing the controller system that a part of the configuration data which precedes, in the data sequence, the one of the check data items has been implemented in the configuration system, and
the processing system sets the status information to express a particular one of the check data items which, in the data sequence, is preceded by the first portion of the configuration data and followed by the second portion of the configuration data.

11. A network element according to claim 1, wherein the configuration system comprises one of more one look-up tables defining actions to be executed in conjunction with managing data to be forwarded by the network element.

12. A network element according to claim 1, wherein the network element is at least one of the following: an Internet Protocol IP router, a MultiProtocol Label Switching MPLS switch, a packet optical switch, an Ethernet switch.

13. A controller for configuring a network element of a software-defined network, the controller comprising:
a data transfer interface for transmitting, to the network element, configuration data enabling the network element to construct a configuration system so as to enable the network element to operate as a part of the software-defined network, and
a processing system for controlling the data transfer interface to transmit the configuration data to the network element, wherein:
the data transfer interface receives, from the network element, status information indicating a first portion of the configuration data, where the first portion of the configuration data has been implemented in the configuration system of the network element prior to an event indicative of a need to verify the configuration system of the network element, and
the processing system identifies, in response to receiving the status information, a second portion from the configuration data on the basis of the status information, the second portion of the configuration data comprising only data external to the first portion of the configuration data,
the processing system controls, in response to the receiving the status information, the data transfer interface to transmit the second portion of the configuration data to the network element so as to enable verification of a portion of the configuration system corresponding to the second portion of the configuration data, the verification of the portion of the configuration system being one of the following: checking integrity of the portion of the configuration system on the basis of the second portion of the configuration data, restoring the integrity of portion of the configuration system on the basis of the second portion of the configuration data, reconstructing the portion of the configuration system on the basis of the second portion of the configuration data.

14. A controller according to claim 13, wherein:
the data transfer interface transmits, to the network element, check data items among the configuration data where the configuration data constitutes together with the check data items a data sequence,
the data transfer interface receives, from the network element, acknowledgements each relating to one of the check data items and informing the controller that a part of the configuration data which precedes, in the data sequence, the one of the check data items has been implemented in the configuration system of the network element, and
the status information expresses a particular one of the check data items which, in the data sequence, is preceded by the first portion of the configuration data and followed by the second portion of the configuration data.

15. A controller according to claim 14, wherein the processing system releases, in order to save memory capacity, memory areas storing a data sequence comprising a third portion of the configuration data in response to receiving a particular one of the acknowledgements that expresses that the third portion of the configuration data has been implemented in the configuration system of the network element.

16. A method for managing a network element of a software-defined network, the network element comprising a data transfer interface for receiving configuration data enabling the network element to construct a configuration system so as to enable the network element to operate as a part of the software-defined network, the method comprising:
transmitting by a controller, the configuration data to the network element, the configuration data enabling the network element to construct the configuration system so as to enable the network element to operate as a part of the software-defined network,
receiving by the controller, from the network element, status information indicating a first portion of the configuration data, where the first portion of the configuration data has been implemented in the configuration system prior to an event indicative of a need to verify the configuration system,
identifying, in response to receiving the status information, a second portion from the configuration data on the basis of the status information, the second portion of the configuration data comprising only data external to the first portion of the configuration data, and
transmitting, in response to the receiving the status information, the second portion of the configuration data to the network element so as to enable verification of a portion of the configuration system corresponding to the second portion of the configuration data, the verification of the portion of the configuration system being one of the following: checking integrity of the portion of the configuration system on the basis of the second portion of the configuration data, restoring the integrity of portion of the configuration system on the basis of the second portion of the configuration data, reconstructing the portion of the configuration system on the basis of the second portion of the configuration data.

17. A method for enabling a controller system of a software-defined network to manage a network element of the software-defined network, the network element comprising a data transfer interface for receiving, from the controller system, configuration data enabling the network element to construct a configuration system so as to enable the network element to operate as a part of the software-defined network, the method comprising:
receiving from the controller system, the configuration data enabling the network element to construct the configuration system so as to enable the network element to operate as the part of the software-defined network,
transmitting, in response to an event indicative of a need to verify the configuration system, status information to the controller system, the status information indicating a first portion of the configuration data, where the first portion of the configuration data has been implemented in the configuration system prior to the event, and
verifying, in response to receiving a second portion of the configuration data, a portion of the configuration system corresponding to the second portion of the configuration data, the second portion of the configuration data comprising only data external to the first portion of the configuration data and verifying the portion of the configuration system being one of the following: checking integrity of the portion of the configuration system on the basis of the second portion of the configuration data, restoring the integrity of portion of the configuration system on the basis of the second portion of the configuration data, reconstructing the portion of the configuration system on the basis of the second portion of the configuration data.

18. A computer program product comprising a non-transitory computer readable medium encoded with a computer program for a network element of a software-defined network, wherein the network element comprises a data transfer interface for receiving, from a controller system of the software-defined network, configuration data enabling the network element to construct a configuration system so as to enable the network element to operate as a part of the software-defined network, the computer program comprising computer executable instructions for controlling a programmable processing system of the network element to:
receive from the controller system, the configuration data enabling the network element to construct the configuration system so as to enable the network element to operate as the part of the software-defined network,
control, in response to an event indicative of a need to verify the configuration system, the data transfer interface to transmit status information to the controller system, the status information indicating a first portion of the configuration data, where the first portion of the configuration data has been implemented in the configuration system prior to the event, and
verify, in response to receiving a second portion of the configuration data, a portion of the configuration system corresponding to the second portion of the configuration data, the second portion of the configuration data comprising only data external to the first portion of the configuration data and verifying the portion of the configuration system being one of the following:

checking integrity of the portion of the configuration system on the basis of the second portion of the configuration data, restoring the integrity of portion of the configuration system on the basis of the second portion of the configuration data, reconstructing the portion of the configuration system on the basis of the second portion of the configuration data.

19. A computer program product according to claim 18, wherein the computer program further comprises computer executable instructions for controlling a programmable processing system of the controller system of the software-defined network to:

identify, in response to receiving at the controller system the status information from the network element, the second portion from the configuration data on the basis of the status information, and control, in response to the receiving at the controller system the status information from the network element, a data transfer interface of the controller system to transmit the second portion of the configuration data to the network element.

\* \* \* \* \*